United States Patent [19]

Spencer

[11] Patent Number: 5,687,395
[45] Date of Patent: Nov. 11, 1997

[54] MAIN MEMORY BUFFER FOR LOW COST / HIGH PERFORMANCE INPUT/OUTPUT OF DATA IN A COMPUTER SYSTEM

[75] Inventor: Thomas V. Spencer, Ft. Collins, Colo.

[73] Assignee: Hewlett-Packard Company, Palo Alto, Calif.

[21] Appl. No.: 330,478

[22] Filed: Oct. 28, 1994

[51] Int. Cl.[6] .................................................. G06F 13/14
[52] U.S. Cl. ........................ 395/872; 395/875; 395/876; 395/733
[58] Field of Search ........................ 395/872, 875, 395/876

[56] References Cited

U.S. PATENT DOCUMENTS

| | | | |
|---|---|---|---|
| 4,138,732 | 2/1979 | Suzuki et al. | 395/851 |
| 4,821,185 | 4/1989 | Esposito | 395/872 |
| 4,868,742 | 9/1989 | Gant et al. | 395/850 |
| 5,179,661 | 1/1993 | Copeland, III et al. | 395/250 |
| 5,212,795 | 5/1993 | Hendry | 395/848 |
| 5,249,271 | 9/1993 | Hopkinson et al. | 395/872 |
| 5,299,315 | 3/1994 | Chin et al. | 395/250 |

*Primary Examiner*—William M. Treat
*Assistant Examiner*—Patrica L. Winder

[57] ABSTRACT

A system for transferring data between main memory and an input/output device in a computer system, where device driver software stores an address of a circular buffer into the device and then the device automatically transfers data to or from the buffer. The system reduces complexity within the device by always starting the circular buffer on a page boundary, and allowing the circular buffer to be only one page long. Each time the buffer address passes either zero or half the buffer size, the system interrupts the processor to allow the driver software to transfer, to a hard disk or other area of memory, the contents of the half of the buffer that was just processed. The system further reduces complexity by transferring only eight bits of data into each word of the buffer within memory, therefore avoiding the complexity of byte packing.

6 Claims, 5 Drawing Sheets

MAIN MEMORY BUFFER FOR LOW COST / HIGH PERFORMANCE INPUT/OUTPUT OF DATA IN A COMPUTER SYSTEM

FIELD OF THE INVENTION

This invention relates to computer systems and more particularly to data transfer between main memory and peripheral devices in such computer systems.

BACKGROUND OF THE INVENTION

There are traditionally two basic types of input/output (I/O) used within computer systems—interrupt driven and direct memory access (DMA). Each of these types of I/O has its advantages and disadvantages, both in terms of performance and cost.

Interrupt driven I/O interrupts the main processor each time some amount of data is ready to be transferred. The interrupt causes driver routine software, programmed specifically for the device, to transfer the data to or from the device as required by the operation. Because of the relatively simple circuitry required within the peripheral device, interrupt driven I/O is well suited for low cost implementations that do not require very high data transfer rates. The actual data transfer rate for this type of I/O system is limited by a combination of the processor interrupt response time and the amount of local buffering within the peripheral device that is available. Local buffers within the peripheral device are expensive when compared to storage in main memory, therefore these buffers are usually small. There is a practical limit to the transfer rates achievable with interrupt driven I/O, based on the cost of the size of the local buffer within the peripheral device and the acceptable overhead incurred by the processor to service the I/O device interrupts.

DMA I/O devices transfer data by requesting the use of the system bus and performing the electronic protocol necessary to transfer data directly between the peripheral device and an arbitrary address within the main memory of the computer system. That is, driver software is not required to transfer the data to or from main memory. DMA devices also typically byte pack data when writing to a memory having a data bus wider than one byte. That is, if the memory data bus is, for example, four bytes, the DMA controller for the device will typically accumulate 4 bytes of data during a device read operation, and perform one memory write to store all 4 bytes into memory at the same time. During a device write operation, the controller will transfer 4 bytes at a time from the memory to the controller, and then separate the bytes to write each byte separately to the device. This has the advantage of not needing to interrupt the processor to transfer data, thus, less processor overhead is incurred. This lower processor overhead allows DMA I/O devices to transfer data at a very high rate without adversely affecting the performance of the overall computer system. This high data transfer rate, however, comes at the expense of peripheral device controller complexity which adds to the cost of the peripheral device controller, typically driving the cost higher than the cost of an interrupt driven I/O device.

There is need in the art then for an input/output system that is capable of performance levels equivalent to DMA type devices, while reducing the electronic circuitry within the controller of the peripheral device. The present invention meets these and other needs in the art.

SUMMARY OF THE INVENTION

It is an aspect of the present invention to provide a high performance but low cost system for transferring data between a peripheral device and a main memory within a computer system.

Another aspect of the invention is to provide a system that performs I/O transfers without requiring an interrupt for each data byte transferred.

Yet another aspect of the invention is to provide a system than performs I/O transfers using a limited type of direct memory access without requiring the overhead circuitry of a full direct memory access system.

The above and other aspects of the invention are accomplished in a system where device driver software stores an address of a circular buffer into a peripheral device and then the peripheral device transfers data to or from the circular buffer. Complexity within the peripheral device is reduced by having the circular buffer always start on a page boundary, and by having the circular buffer be a fixed size of one page. Therefore, the low order address bits of the circular buffer must start at zero, and the buffer wraps each time one page is filled.

Each time the circular buffer passes half-full (or half-empty), and each time the circular buffer passes zero, the processor is interrupted so that the driver software can transfer the contents of the half of the circular buffer not being used. The circular buffer data is transferred to or from a hard disk within the system, or to another memory area within the computer system, in order to free up half of the circular buffer for later use.

The system further reduces complexity by transferring only one byte of data into each word of the processor storage, therefore avoiding the complexity of byte packing.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
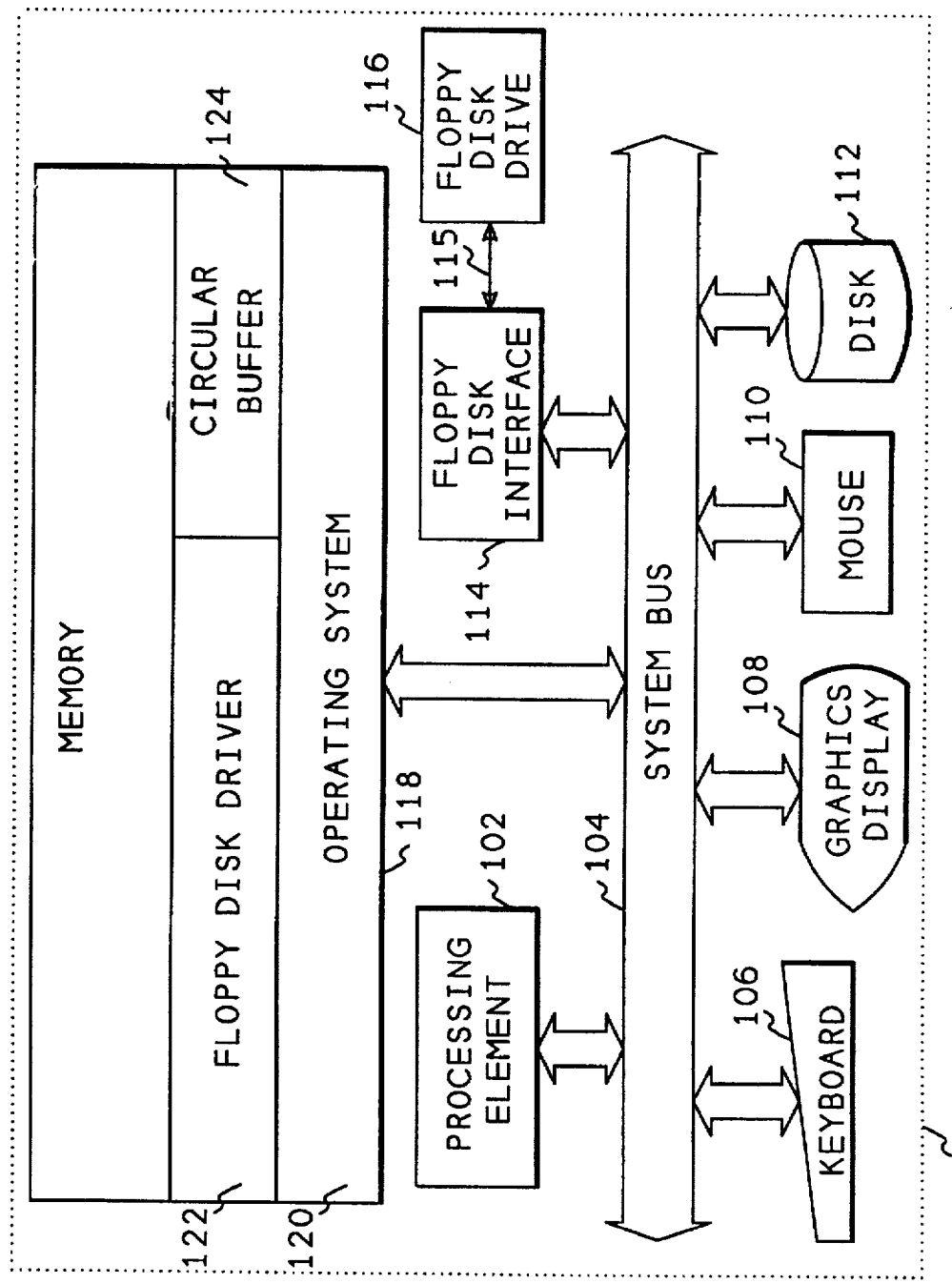
FIG. 1 shows a block diagram of a computer system incorporating the present invention.

FIG. 1 shows a block diagram of a computer system incorporating the I/O system of the present invention. Referring now to FIG. 1, a computer system 100 contains a processing element 102 which communicates to other elements of the computer system 100 over a system bus 104. A keyboard 106 captures text input to the computer system 100 and a mouse 110 captures graphical locator input to the computer system 100. A graphics display 108 provides output from the computer system 100 including both text and graphical output. A hard disk 112 is used to store the peripheral driver software of the present invention as well as data being transferred to or from the peripheral device. A floppy disk interface 114 contains the hardware of the present invention and transfers data to or from a floppy disk drive 116. Those skilled in the art will recognize that the present invention can be used with many peripheral devices in addition to floppy disks.

A memory 118 contains an operating system 120, which can be any one of a number of operating systems, such as, for example, the UNIX operating system. Floppy disk driver software 122 sets up the floppy disk interface 114 and processes the circular buffer 124, during the transfer of data.

Figure 2:
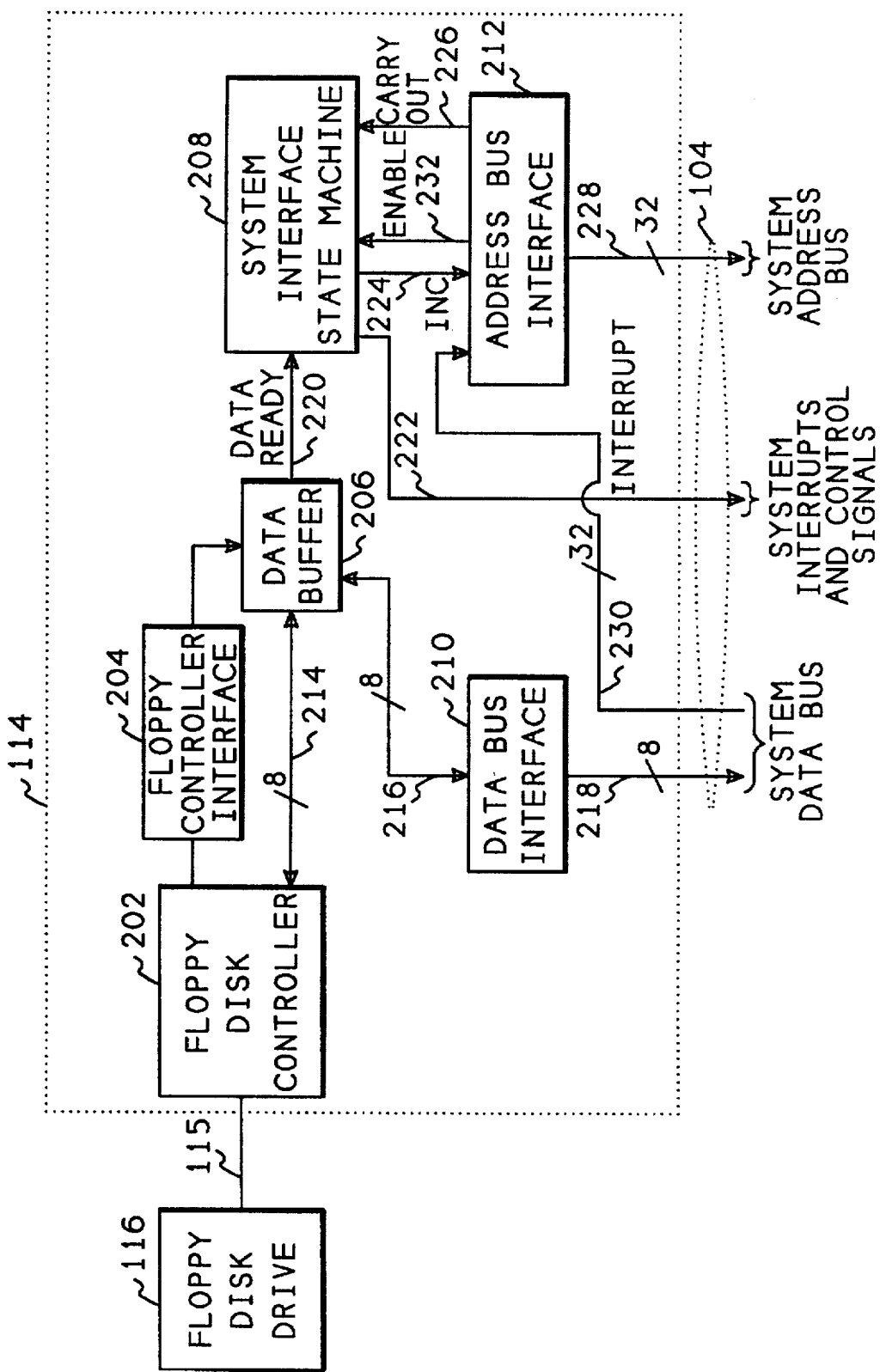
FIG. 2 shows a block diagram of the floppy disk interface of FIG. 1.

FIG. 2 shows a block diagram of the floppy disk interface 114 of FIG. 1. Referring now to FIG. 2, data being transferred to or from the floppy disk drive 116 is transferred over a cable 115 to a floppy disk controller chip 202. The floppy disk controller 202 is a conventional integrated circuit readily available from numerous manufacturers. A conventional floppy controller interface 204 controls the floppy disk controller 202 and a data buffer 206 to transfer data to or from the floppy disk controller 202 over an eight bit (one byte) wide bus 214 which connects the floppy disk controller and a data buffer 206. Thus, all data being transferred to or from the floppy disk drive 116 transfers through the data buffer 206. The circuitry between the data buffer 206 and the floppy disk drive 116 is conventional and well known in the art, therefore, it will not be described further.

Data being transferred between the data buffer 206 and the memory 118 (FIG. 1) passes over an eight bit bus 216 through a data bus interface 210 and over the system bus 104 through an eight bit bus 218. The actual width of the system data bus within the system bus 104 may be wider than eight bits, and typically may be sixteen or thirty-two bits wide. The present invention, however, uses only the low order eight bits of the system data bus.

Whenever the data buffer 206 has a free element and is ready to accept data during a write operation, or has a data byte available during a read operation, it sends a signal over the data ready signal line 220 to a system interface state machine 208. The system interface state machine 208 controls the transfer of data to or from the memory 118 (FIG. 1) over the system bus 104 and will be described below with respect to FIG. 4.

An address bus interface 212 contains a buffer pointer register which is used to hold the memory address to or from which data is being transferred. This interface will be described below with respect to FIG. 3. The low order bit of the buffer pointer register 308, called the enable bit 306, is used by the driver software 122 (FIG. 1) to cause the system interface state machine 208 to transfer data. When the enable bit is set, that is, it has the value 1 or it is a logic TRUE, enable signal 232 is sent to the system interface state machine 208 to cause transfer operations to occur.

Figure 3:
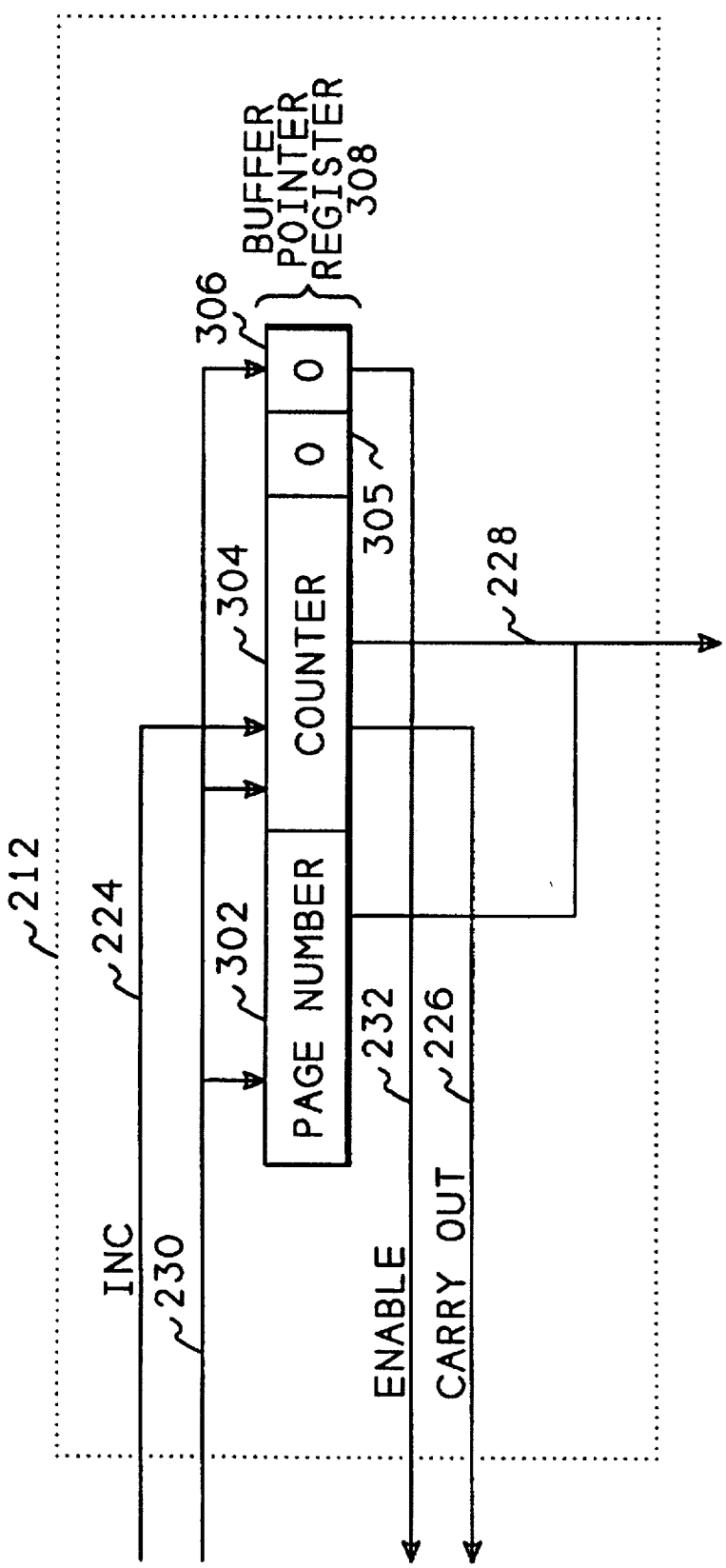
FIG. 3 shows a block diagram of part of the address bus interface of FIG. 2.

FIG. 3 shows a block diagram of the buffer pointer register within the address bus interface 212 (FIG. 2). Referring now to FIG. 3, the buffer pointer register 308 is comprised of a page number 302, a counter 304, and two low order bits 305 and 306. To start the transfer of data, the floppy disk driver software 122 (FIG. 1) stores an address into the buffer pointer register 308. The high order bits of this address are the page number 302, and in the present invention the page number comprises twenty bits. Those skilled in the art will recognize, however, that the buffer pointer register 308 would be the same width as the address bus within the particular computer system, which may be any number of bits as specified by the particular system, and therefore, the page number may be more or less than 20 bits.

The low order twelve bits of the present invention are stored into the counter 304 and the bits 305 and 306. Thus, the highest ten bits of the low order twelve bits are stored into the counter 304, with the last two bits being stored into the bits 305 and 306. The lowest order bit of the address, stored in bit 306, enable bit which starts data transfer by sending the enable signal 232 to the system interface state machine 208 (FIG. 2). After each byte of data is transferred to or from the floppy disk interface 114, the system interface state machine 208 sends the INC signal 224 which causes the counter 304 to increment by a count of one. Since the low order two address bits are not used in this system, incrementing the counter 304 by a value of one increments the address that will be sent to the system bus 104 by a value of four. In this manner, the present invention stores one byte in every thirty-two bit word within the main memory 118. Those skilled in the art will recognize that this only occurs in a system with a thirty-two bit data bus. In systems with a smaller data bus, for example, sixteen bits, the present invention would store one byte out of every other byte within the main memory 118, and would not use bit 305. Likewise, for any other bus width, the system of the present invention stores one byte for each unit of data transferred over the system bus 104.

Each time the counter 304 passes either a count of 512 or a count of zero, it sends a carry out signal 226 to the system interface state machine 208 (FIG. 2). This carry out signal enables the system interface state machine 208 to interrupt the processor 102 (FIG. 1) to allow the floppy disk driver software 122 to process the contents of the circular buffer 124. Of course, any size counter could be used, and the present invention would send the carry out signal at zero and half the size of the counter.

In a like manner, the carry out signal, and therefore interrupts, could be sent more often, or only once, by detecting any interval of the count and sending the carry out signal at each interval.

Figure 4:
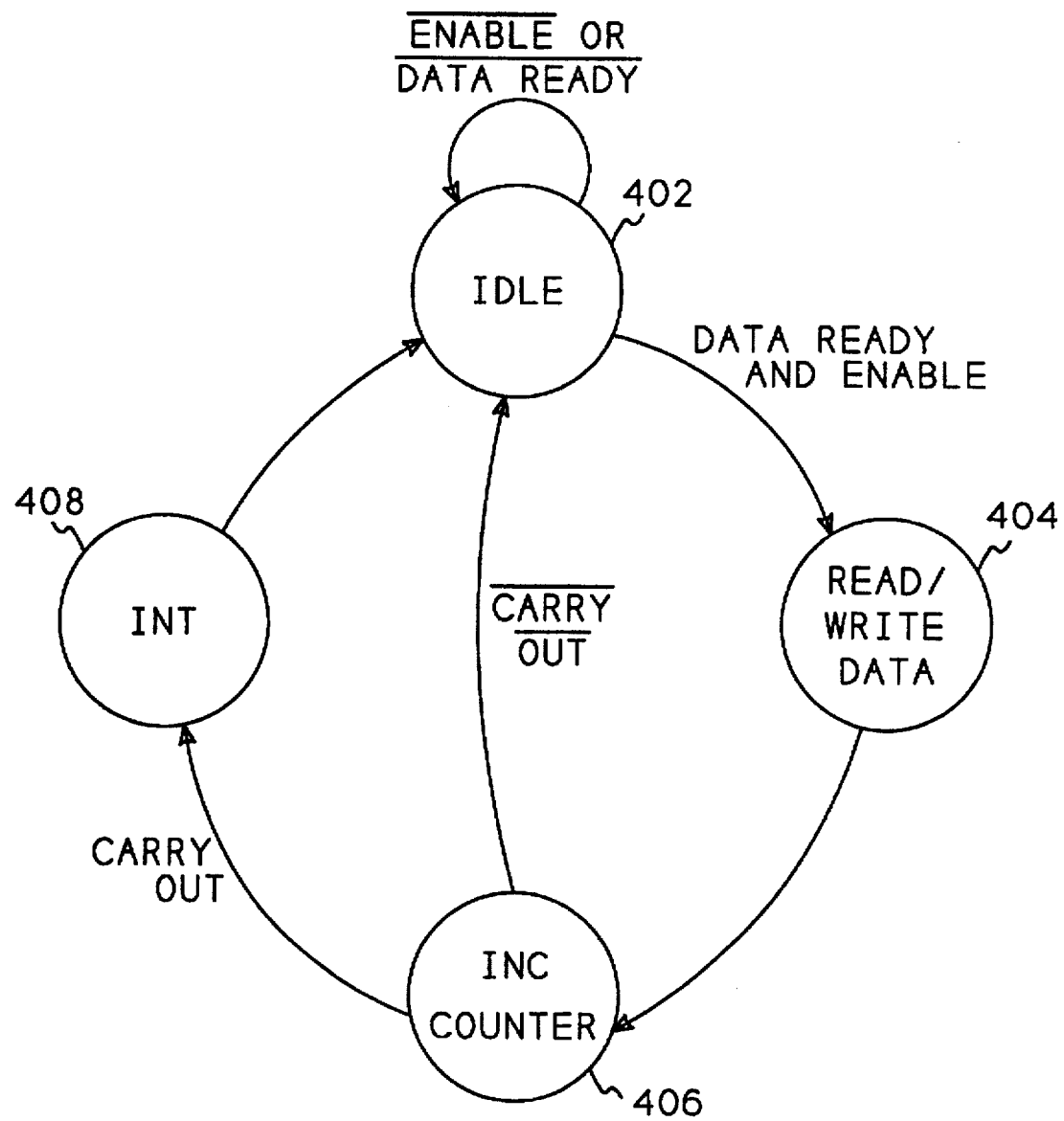
FIG. 4 shows a state diagram of the system interface controller of FIG. 2.

FIG. 4 shows a state diagram of the system interface state machine 208 of FIG. 2. Referring now to FIG. 4, when no operations are being performed, the system interface state machine stays in the IDLE state 402. The system is sure to stay in this state, because the enable signal 232 remains low until the low order bit within the buffer pointer register 308 (FIG. 3) is set. Once the enable signal is set, the state machine remains in state 402 until the data ready signal 220 is sent by the data buffer 206. When both data ready 220 and enable 232 are set, the state machine transfers from state 402 to READ/WRITE DATA state 404. During this state, the system interface state machine 208 sends signals over interface lines 218, 222, and 228, to cause a read or a write operation between the data buffer 206 and the memory 118. The details of how a direct memory access read or write operation is accomplished on a bus are specified by the computer system manufacturer and are, therefore, well known in the art.

After the byte of data is read or written, state 404 transfers to INC COUNTER state 406 which causes the INC signal 224 to be sent to the address bus interface 212 where it increments the counter 304. The state machine then examines the carry out signal 226, and if the carry out signal is not set, state 406 transfers back to IDLE state 402 to wait for the next data ready signal.

If the carry out signal is set, state 406 transfers to INT state 408, which sends an interrupt signal over the line 222 to interrupt the processor 102. After the interrupt is sent, state 408 transfers back to IDLE state 402 to wait for the next data ready signal.

Figure 5:
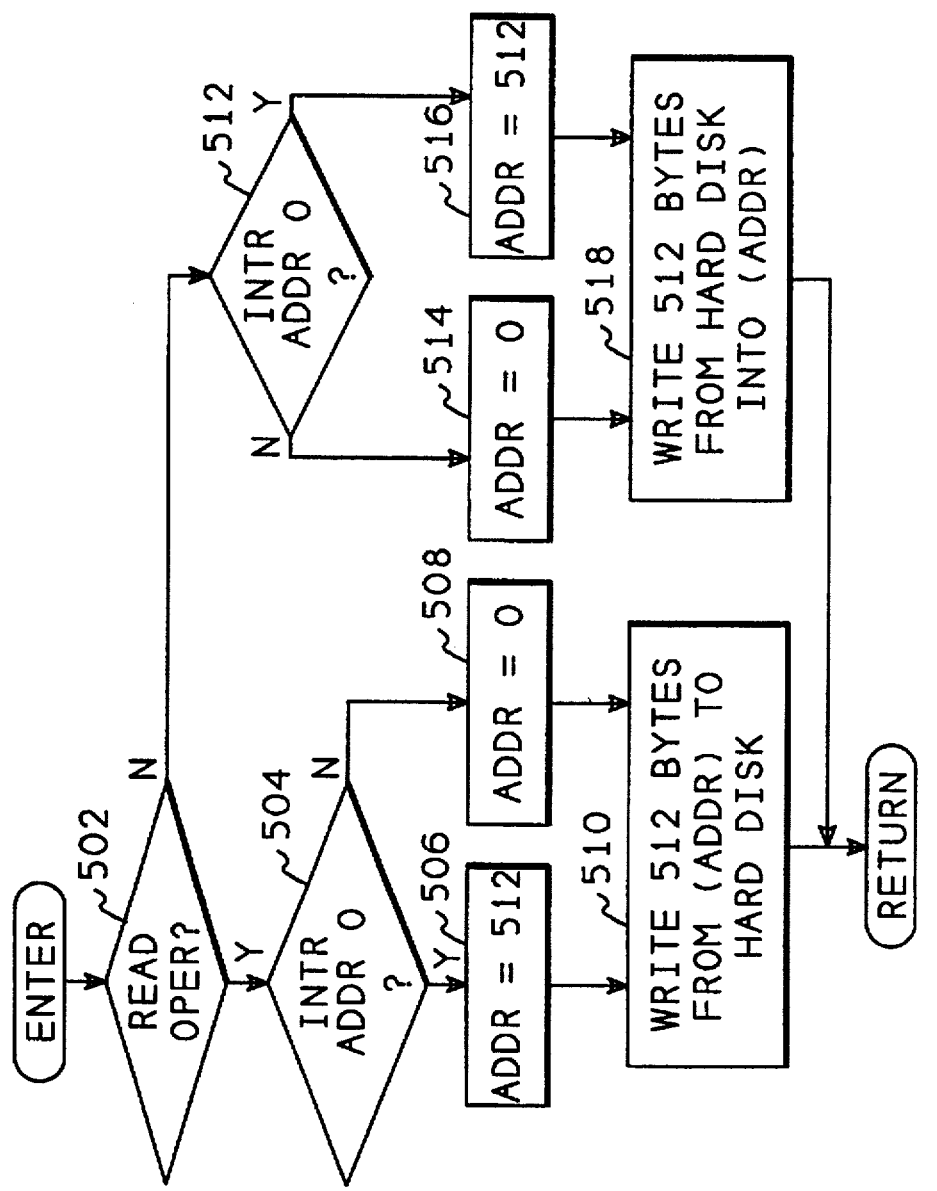
FIG. 5 shows a flowchart of the portion of the floppy disk driver of FIG. 1 that processes the circular buffer.

FIG. 5 shows a flowchart of the portion of the floppy disk driver software 122 of FIG. 1 that processes data within the circular buffer 124. This section of the code is called each time an interrupt is received from the floppy disk interface 114, therefore, this section of the code empties data from the circular buffer 124 or places new data into the circular buffer 124, depending upon whether a read or write operation is being performed, so that it can continue to be processed through the system bus 104 by the floppy disk interface 114.

Referring now to FIG. 5, after entry, block 502 determines whether the floppy disk interface 114 is performing a read operation. If a read operation is being performed, block 502 transfers to block 504 which determines whether the interrupt address is zero or 512. This determination can be made in several ways, either by having separate interrupts for the interrupt at zero and the interrupt at 512, or by reading the buffer pointer register back from the floppy disk interface 114 in order to determine the value contained within the counter bits 304.

If the interrupt address is zero, block 504 transfers to block 506 which sets the value of the ADDR variable to 512 and then block 510 writes 512 bytes from the second half of the circular buffer 124 (last 512 bytes) to the hard disk, or to another memory area, before returning. While this data is being written, it is byte packed to that it completely fills each word of the destination area or each byte of the hard disk sector.

The transfer is done from the second half of the circular buffer 124, because the interrupt address was zero. An interrupt at zero means that the floppy disk interface 114 will be transferring data to addresses 1, 2, etc. shortly thereafter. Therefore, the first half of the circular buffer 124 cannot be modified, instead the driver software will transfer data out of the second half of the circular buffer 124, to make it available to the floppy controller.

If the interrupt address is not zero, block 504 transfers to block 508 which sets the variable ADDR to zero and then block 510 writes the first half (first 512 bytes) of the circular buffer 124 to the hard drive. Again, while this data is being written, it is byte packed to that it completely fills each word of the destination area or each byte of the hard disk sector.

If the operation being performed is not a read operation, block 502 transfers to block 512 which again determines whether the interrupt address is zero and if the address is zero, block 512 transfers to block 516 which sets the contents of the ADDR variable to 512. Block 518 then reads 512 bytes into the second half of the circular buffer 124 and byte unpacks the data so that there is only one byte per word, to allow the device to properly read the data.

If the interrupt address is not zero, block 512 transfers to block 514 which sets the value of the ADDR variable to zero and then block 518 reads 512 bytes from the hard disk into the first half of the circular buffer 124 and byte unpacks the data.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A memory interface for transferring data between a memory of a computer system and an input/output device, said interface comprising:

an address register for addressing data within said memory said address register comprising, plurality of page number bits, and a plurality of counter bits concatenated to a low order bit of said page number bits;

a data buffer for storing at least one unit of data being transferred, said data buffer having a data ready signal that indicates when said data buffer can transfer data;

a state machine for accessing said memory at an address contained in said address register to transfer a unit of data between said memory and said data buffer when said data ready signal is set to a predetermined value, wherein said state machine increments said counter bits each time said state machine accesses said memory and further wherein said state machine sends an interrupt signal to a processor of aid computer system each time a carry out occurs from said counter bits, wherein interrupts are created without comparing said bits to another register.

2. The memory interface of claim 1 wherein said plurality of page number bits and said plurality of counter bits address more than one unit of data in said memory each time said memory is accessed, but stores data into only one unit of data of said more than one unit of data addressed.

3. The memory interface of claim 1 wherein said said carry out occurs at values of zero and one half of a largest value said counter can contain.

4. A method for transferring data between a memory of a computer system and an input/output device, said method comprising the steps of:

(a) storing a page number in said device;

(b) setting a counter in said device to a predetermined value;

(c) testing a data ready signal in a data buffer of said device;

(d) accessing said memory using a concatenation of said page number and said counter as an address in said memory to transfer a unit of data between said memory and said data buffer when step (c) indicates said data ready signal is set to a predetermined value; and (e) incrementing said counter value (f) sending an interrupt signal to a processor of said computer system each time a carry out occurs from said counter bits after step (e) increments said counter value, wherein interrupts are created without comparing said counter value to a value contained in another register.

5. The method of claim 4 wherein said address accesses more than one unit of data in said memory each time said memory is accessed, but stores data into only one unit of data of said more than one unit of data addressed.

6. The method of claim 4 wherein said carry out occurs at values of zero and one half of a largest value that said counter can contain.

* * * * *

UNITED STATES PATENT AND TRADEMARK OFFICE
CERTIFICATE OF CORRECTION

PATENT NO. : 5,687,395
DATED : November 11, 1997
INVENTOR(S) : Thomas V. Spencer It is certified that error appears in the above-identified patent and that said Letters Patent is hereby corrected as shown below:

Column 6, line 24, "*aid*" should read -- *said* --.

Signed and Sealed this

Thirteenth Day of February, 2001

Attest:

NICHOLAS P. GODICI

Attesting Officer

Acting Director of the United States Patent and Trademark Office